US011181169B2

(12) United States Patent
Wetzels et al.

(10) Patent No.: US 11,181,169 B2
(45) Date of Patent: Nov. 23, 2021

(54) CHAIN WITH ENDLESS BRAIDED CHAIN-LINK

(71) Applicant: DSM IP ASSETS B.V., Heerlen (NL)

(72) Inventors: Karel Jozef Wetzels, Echt (NL); Dietrich Wienke, Echt (NL); Jozef Siegfried Johannes Homminga, Echt (NL); Roelof Marissen, Echt (NL); Rigobert Bosman, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 138 days.

(21) Appl. No.: 16/306,095

(22) PCT Filed: Mar. 6, 2017

(86) PCT No.: PCT/EP2017/055212
§ 371 (c)(1),
(2) Date: Nov. 30, 2018

(87) PCT Pub. No.: WO2017/077141
PCT Pub. Date: May 11, 2017

(65) Prior Publication Data
US 2019/0301568 A1    Oct. 3, 2019

(30) Foreign Application Priority Data
Jun. 3, 2016  (EP) .................................... 16172945

(51) Int. Cl.
*F16G 15/12*    (2006.01)
*D04C 1/06*    (2006.01)
*F16G 13/12*    (2006.01)

(52) U.S. Cl.
CPC ............... *F16G 15/12* (2013.01); *D04C 1/06* (2013.01); *F16G 13/12* (2013.01); *D07B 2201/1096* (2013.01)

(58) Field of Classification Search
CPC .......... F16G 15/12; F16G 13/12; F16G 15/02; F16G 13/18; D07B 2201/1096; D07B 1/025; D07B 1/04; B66C 1/12
(Continued)

(56) References Cited

U.S. PATENT DOCUMENTS 4,779,411 A    10/1988 Kendall
7,823,496 B2 *    11/2010 Bosman .................... D04C 1/12
87/9

(Continued)

FOREIGN PATENT DOCUMENTS

EP        0 504 954        9/1992
WO       2004/067434       8/2004
(Continued)

OTHER PUBLICATIONS

International Search Report for PCT/EP2017/055212 dated Jun. 13, 2017, 3 pages.
(Continued)

*Primary Examiner* — Teresa M Ekiert
*Assistant Examiner* — Teresa A Guthrie
(74) *Attorney, Agent, or Firm* — Nixon & Vanderhye P.C.

(57) ABSTRACT

A chain is provided which includes a plurality of interconnected chain-links. At least one chain-link of the chain has a braided core which includes a first primary strand having polymeric elongated elements having a tenacity of at least 1.0 N/tex. The braided core is braided from at least 2 consecutive turns of the primary strand. Also disclosed is a braided endless shaped element suitable as chain-link for the chain as well as a chain which has a tenacity (Ten) in N/Tex and a combined titer of the 2 legs of the chain-link having polymeric elongated elements (T) in MTex satisfying the relationship of Ten≥0.50*T−0.05.

28 Claims, 1 Drawing Sheet

(58) Field of Classification Search
USPC .............................................. 59/84
See application file for complete search history.

(56) References Cited

U.S. PATENT DOCUMENTS

| | | | |
|---|---|---|---|
| 8,215,094 B2* | 7/2012 | Wienke | F16G 13/12 |
| | | | 59/76 |
| 8,468,793 B2* | 6/2013 | Wienke | F16G 13/12 |
| | | | 59/78 |
| 2009/0051181 A1* | 2/2009 | Goossens | B66C 1/12 |
| | | | 294/74 |
| 2009/0165637 A1 | 7/2009 | Bosman et al. | |
| 2013/0129952 A1* | 5/2013 | Callhoff | B32B 1/02 |
| | | | 428/36.2 |

FOREIGN PATENT DOCUMENTS

| | | |
|---|---|---|
| WO | 2005/066401 | 7/2005 |
| WO | 2008/089798 | 7/2008 |
| WO | 2009/115249 | 9/2009 |
| WO | 2012/139934 | 10/2012 |
| WO | 2013/186206 | 12/2013 |

OTHER PUBLICATIONS

Written Opinion of the ISA for PCT/EP2017/055212 dated Jun. 13, 2017, 5 pages.
McKenna et al., "Handbook of Fibre Rope Technology", The Textile Institute, 28 pages.

* cited by examiner

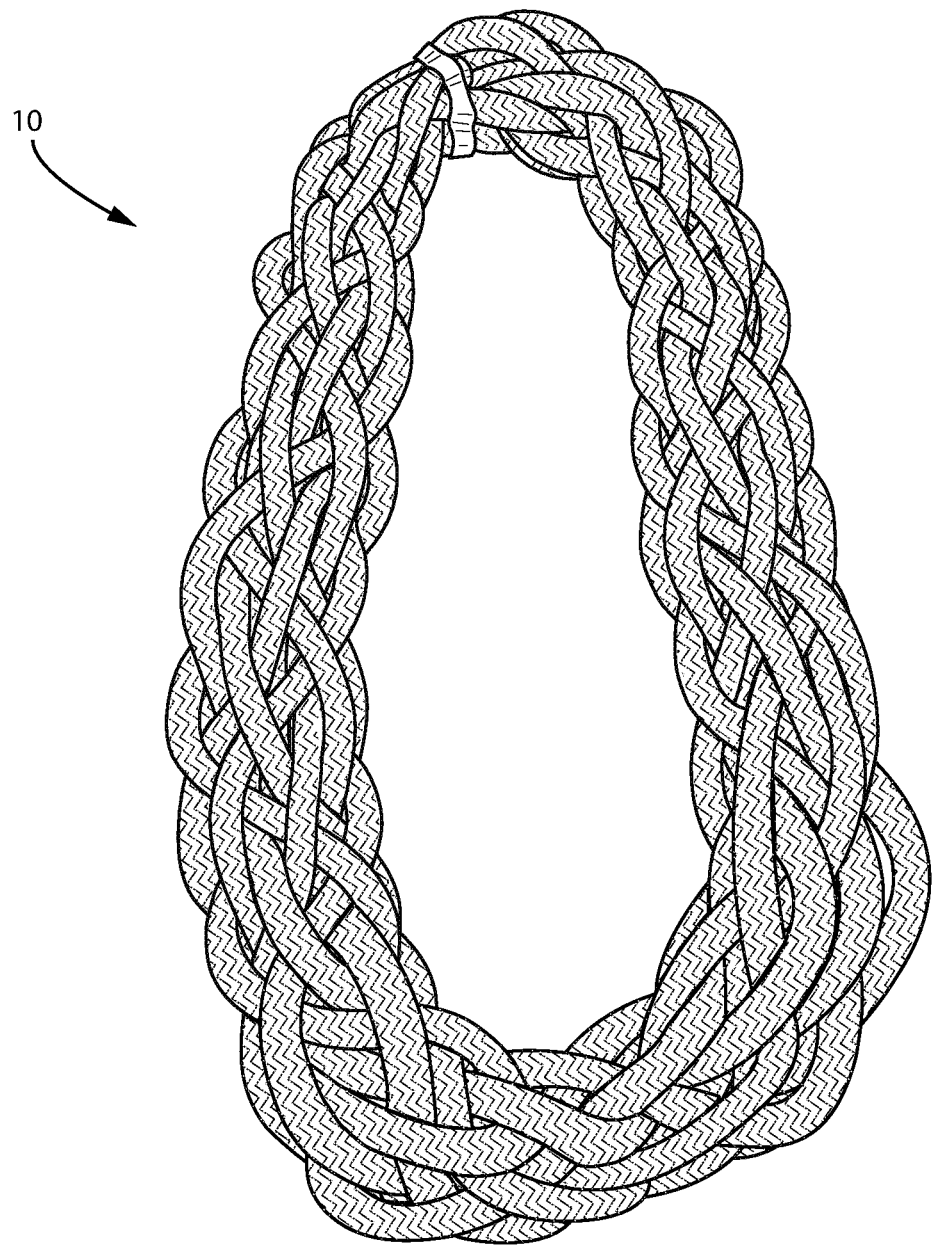

CHAIN WITH ENDLESS BRAIDED CHAIN-LINK

CROSS-REFERENCE TO RELATED APPLICATIONS

This application is the U.S. national phase of International Application No. PCT/EP2017/055212 filed Mar. 6, 2017 which designated the U.S. and claims priority to EP Patent Application No. 16172945.4 filed Jun. 3, 2016, the entire contents of each of which are hereby incorporated by reference.

FIELD

The invention relates to a chain comprising multiple chain-links, at least one chain-link comprising a load-bearing core comprising a first primary strand, the first primary strand comprising polymeric elongated elements wherein the polymeric elongated elements have a tenacity of at least 1 N/tex. The invention also relates to an endless shaped element suitable as a load bearing core for the chain of the invention.

BACKGROUND AND SUMMARY

A chain should desirably be capable of transmitting forces under all kinds of circumstances and environmental conditions, often for a prolonged period of time, without the chain being affected in any way, such as by breaking, fraying, cut, fatigue, ageing, corrosion, damaging, and so on. Other requirements may also be important. During use in the above-mentioned operations, chains are subjected to substantial wear and tear conditions which may lead to extensive abrasion of the chain. Chains should therefore be durable. Chains moreover should not only be strong and durable, but at the same time be as lightweight as possible, in order not to unduly increase health risks during handling or reduce payload, this requirement being even more important for heavier, stronger chains.

A chain with low maximum break load comprising a plurality of interconnected links comprising polymeric elongated elements, is known from WO2008/089798. WO2008/089798 discloses chains comprising engaging links of ultra-high molecular weight multifilament yarns. The links are constructed as multiple turns of yarns or multiple turns of straps comprising yarns. The chains described in WO2008/089798 have good tenacities and abrasion properties. Yet WO2013186206 identified in its comparative experiments that high maximum break load chain-links with such constructions suffer a substantial efficiency loss. Accordingly, WO2013186206 describes chain-links with increased efficiencies as compared to the chain-links of WO2008/089798. WO2013186206 provides an efficiency improvement by an endless shaped element comprising a strip that is wound about itself while comprising a 180° twist, forming a so-called Moebius loop. Herewith the efficiency of said endless shaped elements is improved, but the authors are silent about the strength of the therein described chains comprising such chain-links. Furthermore EP 1 587 752 describes round slings consisting of a load-bearing core containing at least two turns of a load bearing rope of which the terminal ends are spliced.

The object of the present invention is to provide chain very well capable of transmitting forces and moreover showing improved efficiency, also referred to as strength retention, of the employed polymeric elongated element as compared to the chains known in the art.

This object is achieved according to the invention by a chain comprising a plurality of interconnected chain-links wherein at least one chain-link comprises a braided core comprising a first primary strand comprising a polymeric elongated element wherein the polymeric elongated element has a tenacity of at least 1.0 N/Tex, characterized in that the braided core comprises at least 2 consecutive turns of said first primary strand.

BRIEF DESCRIPTION OF THE DRAWINGS

FIG. 1 is a perspective view of a chain link according to the embodiment described hereinbelow by Example 1.

DETAILED DESCRIPTION

A chain according to the invention shows an unexpectedly increased efficiency in that the chain retains more from the tenacity of the comprised elongated elements, especially for high maximum break load chains. Further the chain maintains or even increases its durability over comparative prior art and has a substantially improved damage tolerance in that a number of primary strands may be ruptured without the breakage of the chain. Moreover, the braided link according to the present invention can be made at ratios of chain link thickness to chain link length that are larger than said ratios for laid links of prior art rope constructions. In addition, there is hardly no upward size limit in production, so strong chains and chain links with large dimensions are possible to produce according to the present invention. Furthermore, the chain links made from the yarns according to the prior art, e.g. as disclosed in WO2008/089798 contain all fibers of the yarn arranged in load direction, whereas the fibers in the braided link in the chain according to the present invention may not be all arranged in load direction, i.e. the fibers are not over the majority of their length. Also, the core of the chain link of the present invention may contain fibers arranged under an angle with the load direction. Therefore, the strength, i.e. tenacity of the chain according to the present invention is surprisingly much higher than the strength, i.e. tenacity of the chains according to prior art, as the skilled person in the art would expect to obtain a chain having lower strength for chains containing fibers that are not arranged in load direction.

Preferably, the static strength of the chain of the invention is at least 10 kN, more preferably at least 50 kN, even more preferably at least 100 kN, yet even more preferably at least 300 kN or at least 500 kN, yet even more preferably at least 1000 kN, yet even more preferably at least 10000 kN, yet even more preferably at least 50000 kN, yet even more preferably at least 100000 kN, yet even more preferably at least 150000 kN, yet even more preferably at least 500000 kN, most preferably at least $10^6$ kN. By static chain strength is herein understood the strength of the chain when the chain is subjected to a static load.

The chain structure may be any structure known in the art. The chain according to the invention is characterized in that the chain comprises interconnected chain-links. Such chains are easily tailored according to their needs. For instance, their length is easily adjusted by adding or removing links. Adding links is for instance carried out by braiding several windings of a primary strand through the opening of an existing chain-link, and optionally securing the newly made chain-link by fastening the ends of the primary strand. Also side chains may easily be added to the (main) chain in a similar manner. This embodiment of the chain according to the invention also has an improved strength, since the links are endless, and therefore do not have many cut ends.

The chain-links may also be interconnected by all means known in the art. Preferably the interconnected chain-links are interconnected by interlacing. In still another embodiment the chain according to the invention is characterized in that the links are interconnected by connecting means which are preferably ring shaped. In such an embodiment, the connecting means preferably comprise UHMWPE elongated elements. They may be attached to the connecting means by any suitable means, but preferably by stitching. In a preferred embodiment, the ring shaped connecting means may have different shapes as for example a circle, an oval, a triangular or a rectangular shape and may be made of any suitable material, including metal.

The elongated element is preferably a fiber, a yarn, and especially a multifilament yarn. By fiber is herein understood an elongate body, the length dimension of which is much greater than the transverse dimensions of width and thickness. Accordingly, the term fiber includes filament, bundle, ribbon, strip, band, tape, and the like having regular or irregular cross-sections. The fiber may have continuous length, known in the art as filament, or discontinuous length, known in the art as staple fiber. Staple fibers are commonly obtained by cutting or stretch-breaking filaments. A yarn for the purpose of the invention is an elongated element containing many fibers. A multifilament yarn for the purpose of the invention is an elongated element containing many filaments.

It was found that the mechanical properties of the chain according to the invention, in particular its strength can be improved by pre-stretching the chain or each of the chain-links prior to its use below the melting point of the polymer. For polyethylene elongated elements the pre-stretching of the chain or chain-links is performed between 80-140° C., more preferably between 90-130° C.

In one embodiment, the core of the chain-link or the chain according to the invention is pre-stretched at a temperature below the melting temperature $T_m$ of the polymer, by applying a static load of at least 5%, more preferably at least 10%, and most preferably at least 15% of the breaking load of the core or the chain for a period of time long enough to achieve a permanent deformation of the core of between 2 and 20%, and more preferably between 5 and 10%. By permanent deformation is herein understood the extent of the deformation from which the braided core does not recover when substantially load free.

In another embodiment, the chain according to the invention is subjected to a number of load cycles. Preferably, the number of cycles ranges from 2-25, more preferably from 5-15, and most preferably from 8-12, whereby the maximum load applied is lower than 45% of the breaking load of the chain, more preferably lower than 35% of the breaking load of the chain, and most preferably lower than 25% of the breaking load of the chain. It is possible according to the invention to unload the chain during load cycling. In a preferred method however, the minimum load applied is at least 1%.

By plurality of chain-links is meant in the context of the present invention at least 2 chain-links that are interconnected as described further above. Typically for a chain a plurality is at least 3, preferably at least 4 and most preferably at least 5 interconnected chain-links. Chains with increasing numbers of links have increased versatility in their applications.

At least one chain-link of the chain according to the invention comprises a braided core comprising at least 2 consecutive turns of a first primary strand, whereas the braided core preferably comprises further consecutive turns of said first primary strand. The braided core may also comprise single or multiple turns of further (second, third, etc.) primary strands. By turns in the context of the present invention is understood that a length of a primary strand completes a loop or revolution within the braided core of the chain-link, said primary strand being a constituting part of the braided core or even that the primary strand and the optional further primary strands form the braided construction of the core. In this context turn may be synonym to loop or revolution. By consecutive turns is understood that said length of primary strand after completion of a first turn is directly engaged in a second turn within the braided core. Accordingly, the braided core or braided cores of the chain of the invention have a cross-section comprising a number of cross-sections of primary strands originating from the same or different primary strands. In a preferred embodiment the cross-section of the braided core substantially consists of the cross-sections of primary strands originating from the same or different primary strands. Preferably the braided core has a cross-section equivalent to at least 3, preferably at least 4, more preferably at least 6 cross-sections of the first primary strand. Accordingly, in a preferred embodiment, the braided core comprises at least 3, preferably at least 4 and more preferably at least 6 consecutive turns of the first primary strand. The presence of increased numbers of consecutive turns of first primary strand in the braided core increases the damage tolerance of the braided core and the chain. The more consecutive turns of a specific primary strand the braided core contains, the more robust and damage resistant the braided core is. By increasing said number of consecutive turns of a primary strand in the braided core the resistance to slippage of the chain-link and chain improves. This braided nature of all the consecutive turns within each link lowers by each turn the residual load on the end connection of both remaining ends of the strand significantly. That means, that spliced, stitched, glued, welded or knotted end connection of both ends of the strand are not needed to prevent slipping, since the entire link forms a whole splice in its own, but can be still applied to prevent any slipping at all. There is no upper limit to the number of turns of the same primary strand in the braided core construction but high numbers will increase the level of complexity of the braided core and render the manufacturing more expensive. Preferably the number of turns of the same primary strand in the braided core is at most 24, more preferably at most 18 and most preferably at most 12.

The at least one braided core of the chain according to the invention may comprise one or more further primary strands, each further primary strand forming a single turn or multiple consecutive turns in the braided core. Said further primary strands allow an increased design flexibility at reduced manufacturing effort. Preferably the number of further primary strands in the braided core is at most 11, more preferably at most 5, whereas more preferably the total number of primary strands, including the first primary strand, in the braided core is 1, 2, 3, 4 or 6. It was identified that said preferred number of primary strands represents a good compromise between manufacturing advantages and damage tolerance of the chain of the invention.

In a preferred embodiment, the braided core comprises one or more further primary strands wherein said braided core comprises at least 2 consecutive turns of each of the one or more further primary strands, preferably at least 3 consecutive turns, more preferably at least 4 and most preferably at least 6 consecutive turns of each of the one or more further primary strand. Accordingly, in said preferred embodiment a braided core of the chain of the invention may comprise a total of 2, 3, 4 or 6 distinct primary strands, whereby at least 2, preferably all, of said primary strands form at least 2, preferably at least 3 turns, more preferably at least 4 and most preferably at least 6 consecutive turns of the braided core construction.

Adding the number of turns of each of the distinct primary strands will provide the total number of turns of primary strands present in the braided core. In a preferred embodiment, the ratio of the total number of primary strand turns in the braided core to the number of primary strands in the braided core is at least 2, preferably at least 3, more preferably at least 4 and most preferably at least 6. The higher said ratio the more damage tolerant the chain according to the invention is.

In a preferred embodiment the first primary strand comprises a first polymeric elongated element and the one or more further primary strands comprises one or more further polymeric elongated element, whereby the polymers of the first and the one or more further elongated elements are of the same type, preferably the first primary strand and the one or more further primary strands comprise polymeric fibers of the same type, even more preferably the first primary strand and the one or more further primary strands comprise polymeric yarns of the same type.

In an alternative preferred embodiment the first primary strand comprises a first polymeric elongated element and the one or more further primary strands comprises one or more further elongated elements, wherein at least one of the one or more further elongated elements differ from the first polymeric elongated element, preferably the at least one of the one or more further elongated element differ from the first polymeric elongated element by at least one property selected from the list consisting of material, tenacity, yarn titer, filament titer or creep rate.

The core of the chain-link of the chain according to the invention is braided and may have any braiding structure known to the skilled person as for example disclosed for braided ropes in Chapter 3 of the Handbook of fibre rope technology (eds McKenna, Hearle and O'Hear, Woodhead Publishing Ltd, ISBN 1 85573 606 3). Such structure may for example be single braids in a twill or plain weave fashion, plain or hollow, double braids also called braid on braid or solid braids, depending on the properties the chain should have. In the context of the present invention a core being braided from primary strands is also referred to as braided core.

Braided ropes known in the art are composed of a plurality of distinct primary strands interlaced with each other forming the braided construction of the rope. Slings or endless shaped articles, made from such braided ropes are also well known, whereby a length of a braided ropes is formed into a sling by joining the 2 ends of a said length of braided rope by for example knotting or splicing. In contrast to the braided core of the chain-link of the chain of the invention, such spliced braided ropes comprise a plurality of primary strands substantially equal to the number of primary strands present in the original rope whereby the splice, the section where the ends of the rope overlap, has a length of about 15 to 20 times the diameter of the rope. Especially for chain-links such splice are prohibitively long and thick, especially for large diameter ropes and/or small chain-links. Although the braided core according to the invention may have an appearance similar to the braided sling described here above, a doubling of titre over 15-20 times its diameter will be absent.

The braided core of the chain-link of the chain according to the invention can be of a construction wherein the braiding period, also referred to as the pitch or pitch length (L) related to the diameter (D) of the rope, is not specifically critical; suitable braiding periods are in the range of from 3 to 30 L/D ratio. A higher braiding period results in a looser braided core having higher strength efficiency, but which is less robust and less damage tolerant. Too low a braiding period reduces tenacity of the braided core too much. Preferably therefore, the braiding period is about 5 to 20, more preferably 6 to 15 L/D ratio.

The braided core of the chain-link of the chain according to the invention can have a diameter (D) that varies between wide limits. Smaller diameter cores, for example in the range of from about 1 to 10 mm, are typically applied as chains for securing cargo during transportation. Large diameter, or heavy-duty chains, typically have a diameter of at least 10 mm. In case of a braided core with an oblong cross-section, it is more accurate to define the size of a round core by an equivalent diameter; that is the diameter of a round core of same mass per length as the non-round braided core. The diameter of a braided core in general, however, is an uncertain parameter for measuring its size, because of irregular boundaries of braided cores defined by the primary strands. A more concise size parameter is the linear density of a braided, also called titer; which is the mass per unit length. The titer can be expressed in kg/m, but often the textile units denier (g/9000 m) or dTex (g/10000 m) are used. For large diameter cores the unit of MTex, equivalent to kg/m, is used. Diameter and titer are interrelated according to the formula $D=(4*t/(\pi*10*\rho*v))^{0.5}$, wherein t is the titer in dTex, D is the average diameter in mm, $\rho$ is the density of the filaments in $kg/m^3$, and v is a packing factor (normally between about 0.7 and 0.9). Nevertheless, it is still customary in the rope business to express rope size in diameter values or alternatively for non-circular cross-section in a cross-sectional surface area. The chains according to the invention preferably have at least on braided core with a cross-section of between 5 $mm^2$ and 5 $dm^2$, preferably between 10 $mm^2$ and 3 $dm^2$, more preferably between 50 $mm^2$ and 100 $cm^2$. Preferably, the chains according to the invention are high load carrying chains having an equivalent diameter of at least 10 mm, more preferably at least 15, 20, 25, or even at least 30 mm, since the advantages of the invention become more relevant the larger the braided core.

The inventors identified that by the braided core construction described herein chain-links and especially chains have been made available with tenacity properties superior to the synthetic chains known to date. Therefore one embodiment of the invention concerns the braided endless shaped element suitable to be used as a braided core for a chain-link of the invention wherein the braided endless shaped element comprises at least 2 turns of the first primary strand comprising a polymeric elongated element wherein the polymeric elongated element has a tenacity of at least 1.0 N/Tex. Such endless shaped article may also be referred to as a braided sling or braided endless article and may be characterized by any of the preferred embodiments as further disclosed herein.

Braided cores with diameters, cross-sectional surface areas or titer comprising the polymeric elongated element may provide chains and chain-links with high strength. Therefore one embodiment of the present invention are chains according to the invention wherein the chain has a tenacity of at least 0.50 N/tex, preferably the chain has a tenacity of at least 0.55 N/tex, more preferably at least 0.60 N/tex, even more preferably 0.65 N/tex and most preferably at least 0.70 N/tex. In a further embodiment of the invention, the braided endless shaped elements have a tenacity of at least 0.90 N/tex, preferably at least 1.10 N/tex, more preferably at least 1.20 N/tex and most preferably at least 1.30 N/tex. Herein the tenacity of the chain and cores are expressed as the maximum break load divided by sum of the titers of the 2 legs of the braided core.

It was also observed by the inventors that the chains according to the invention have a higher retention of the tenacity of the underlying polymeric elongated element then known hitherto, also referred to as chain efficiency, whereby chain efficiency is expressed as the ratio between yarn tenacity to chain tenacity. Such effect was specially observed for chains with a very high strength and high titer. Therefore, one embodiment of the present invention relates to synthetic chains, preferably non-heat set synthetic chains, comprising a plurality of interconnected chain-links wherein at least one chain-link comprises a polymeric elongated element wherein the polymeric elongated element has a tenacity of at least 1.0 N/tex wherein the chain has a tenacity (Ten) in N/Tex and a sum of the titer of the 2 legs of the chain-link comprising polymeric elongated elements (T) in MTex [kg/m], with $Ten \geq f*T^{-0.05}$, wherein f is 0.50, preferably 0.55, more preferably 0.60. It is known to the skilled person that the unit of f is such that the overall unit of the right side of the formula, i.e. $f*T^{-0.05}$ is also equal to N/Tex. This means that treatments for further increasing tenacity, e.g. heat setting may be less or even not necessary for chains according to the present invention. Preferably the chains of this embodiment have a breaking strength of at least 100 kN, more preferably of at least 500 kN and most preferably of at least 1 MN.

In a preferred embodiment, the braided core comprising one or more primary strands of which the ends are connected by at least one fastening means. Although the construction inherently prevents dislocation and slipping of the primary strands, it was observed that use of fastening means further improves the stability of the braided core. Examples of fastening means in the context of the present invention are air entanglements, splices, stitches, glue, knots, bolts, heat sealing, rivets or the like.

In a preferred embodiment, the ends of the one or more primary strands are connected by at least one fastening mean to each other. Such a construction may for example be achieved by adjustment of the lengths of the primary strands such that two ends of the primary strands overlap and applying an air entanglement, splice, stitching, gluing, knotting, bolting, heat sealing riveting or the like at said overlapping position. It was observed that a construction according to this embodiment resulted in an optimized efficiency of the braided core. By connected to each other in the context of the present invention is meant both, that the two ends of one and the same primary strand are connected to each other but also that two ends of distinct primary strands are connected to each other. Both alternatives will have the same advantage of stabilizing the braided structure of the core.

In a further preferred embodiment of the invention at least one end, preferably both ends of the first and/or any further primary strand in a braided core of at least one chain-link of the chain according to the invention is buried within the centre of the braided construction. Such preference of the ends being in the inside of the braided construction is independent from the ends being connected, alone or to each other by fastening means. The braided core will substantially provide the option for burying if the total number of primary strand turns is at least 8, preferably at least 12.

Optionally, at least one chain-link, preferably all chain-links further comprise a cover, wherein at least one primary strand or at least one braided core, preferably all primary strands or all braided cores, may be sheathed with a cover. Protective covers may have any construction known in the art and may comprise elongated elements as detailed above. Such a sheath is known for example from U.S. Pat. No. 4,779,411. If a protective cover is used, its thickness is not to be taken into account when determining the titer of the chain-link and/or its braided core.

Preferably, at least one of the braided cores of the chain according to the invention comprises polymeric elongated elements that are at least partially coated with a thermoset or thermoplastic polymer. Any thermoset or thermoplastic polymer able to form a suitable composite with the elongated elements may be used, whereas silicone resins and plastomers are the preferred thermoset or thermoplastic polymers, respectively. A chain according to this embodiment has chain-links which deform to a lesser extent when the chain is stretched. This is advantageous when objects, such as hooks for instance, have to be attached to the chain especially when the chain is under load. The coating also offers further protection against damage development during dynamic loading conditions for instance and limit the deterioration of properties during long term use.

The first primary strand and the optional one or more further primary strands of the braided cores of the chain-link of the invention may have various constructions amongst which twisted or laid strand, a braided strand, a tendon of parallel yarns, or a woven strand. The various constructions, in particular the braided or laid strands, may comprise sub-strands that in turn may be bundles of parallel or twisted yarns. The nature of primary strands will substantially depend on the properties and use of the chain. For heavy duty chains a braided or twisted rope as primary strands will be preferred, providing a braided core with increased robustness.

For braided cores comprising at least one braided or laid primary strands a special embodiment of the invention is that at least 2 terminal ends of the at least one braided or laid primary strand are connected together with a splice. Splices that may be employed will be well known to the skilled person. This embodiment is especially preferred for braided cores with at most 12 total turns of primary strands, preferably at most 8 total turns of primary strands. It was observed that at lower total numbers of turns of primary strands the increased stability of the braided core and the reduced slippage of the primary strands was especially pronounced.

In a further preferred embodiment of the invention the chain-link comprises a braided core wherein at least the first primary strand is a laid rope with preferably 3, 4, 6, or 6+1 sub-strands with a tucked splices between the ends of the laid primary strand, the advantage being very little slip in the connection.

The first primary strand of a braided core of a chain-link of the chain of the invention comprises a polymeric elongated element with a tenacity of at least 1.0 N/Tex. This can be an elongated element, preferably a yarn, of any high performance fibre material, like polyester, polyamide, aromatic polyamide (aramid), poly(p-phenylene-2,6-benzobisoxazole), or polyethylene yarns. Preferably the elongated element is a high modulus polyethylene (HMPE) yarn. HMPE yarn comprises highly-drawn fibres of high-molecular weight linear polyethylene. High molecular weight (or molar mass) here means a weight average molecular weight of at least 400,000 g/mol. Linear polyethylene here means polyethylene having fewer than 1 side chain per 100 C atoms, preferably fewer than 1 side chain per 300 C atoms, a side chain or branch generally containing more than 10 C atoms. The polyethylene may also contain up to 5 mol % of one or more other alkenes which are copolymerisable therewith, such as propylene, butene, hexene, 4-methylpentene, octene.

In a yet preferred embodiment, the polymeric material of choice for the elongated element of the first primary strand is ultrahigh molecular weight polyethylene (UHMWPE). UHMWPE in the context of the present invention has an intrinsic viscosity (IV) of preferably between 3 and 40 dl/g, more preferably between 8 and 30 dl/g. UHMWPE yarns are preferably manufactured according to a gel spinning process as described in numerous publications, including for example WO2005066401, WO2012139934. This process essentially comprises the preparation of a solution of a polyethylene of high intrinsic viscosity, spinning the solution into solutions filaments at a temperature above the dissolving temperature, cooling the solution filaments to below the gelling temperature to from solvent-containing gel filaments and drawing the filaments before, during or after at least partial removal of the solvent.

Advantages of a braided core comprising HMPE fibres include high abrasion resistance, good resistance against fatigue under flexural loads, a low elongation resulting in an easier positioning, an excellent chemical and UV resistance and a high cut resistance.

The elongated elements, preferably the yarns, of the first primary strand are of high strength, sometimes also referred to as high modulus. In the context of the present invention, the elongated element has a tenacity of at least 1.0 N/Tex, preferably of at least 1.2 N/Tex, more preferably at least 1.5 N/Tex, even more preferably at least 2.0 N/Tex, yet more preferably at least 2.2 N/Tex and most preferably at least 2.5 N/tex. When the polymeric elongated element is a UHMWPE yarn, said UHMWPE yarn preferably has a tenacity of at least 1.8 N/Tex, more preferably of at least 2.5 N/Tex, most preferably at least 3.5 N/Tex. Preferably the polymeric elongated element has a modulus of at least 30 N/Tex, more preferably of at least 50 N/Tex, most preferably of at least 60 N/Tex. Preferably the UHMWPE yarn have a tensile modulus of at least 50 N/Tex, more preferably of at least 80 N/Tex, most preferably of at least 100 N/Tex.

The elongated elements of the one or more further primary strands may individually be selected from elongated elements comprising organic or inorganic fibres. Examples of inorganic materials suitable for producing elongated elements, especially fibres include steel, glass and carbon. Examples of organic synthetic materials suitable for producing the elongated elements, especially fibres include polyolefins, e.g. polypropyle (PP); polyethylene (PE); ultrahigh molecular weight polyethylene (UHMWPE), polyamides and polyaramides, e.g. poly(p-phenylene terephthalamide) (known as Kevlar®); poly(tetrafluoroethylene) (PTFE); poly(p-phenylene-2, 6-benzobisoxazole) (PBO) (known as Zylon®); liquid crystal polymers such as for example copolymers of para hydroxybenzoic acid and para hydroxynaphtalic acid (e.g. Vectran®); poly{2,6-diimidazo-[4,5b-4',5'e]pyridinylene-1,4(2,5-dihydroxy)phenylene} (known as M5); poly(hexamethyleneadipamide) (known as nylon 6,6), poly(6-aminohexanoic acid) (known as nylon 6); polyesters, e.g. poly(ethylene terephthalate), poly(butylene terephthalate), and poly(1,4 cyclohexylidene dimethylene terephthalate); but also polyvinyl alcohols and polyacrylonitriles. Also, combinations of elongated elements, preferably yarns, manufactured from the above referred materials can be used for manufacturing the strands. It was observed that the braided core provides chains according to the present invention with a substantially lower slippage which are especially suitable for ropes comprising high strength yarns.

Methods of Measuring

Intrinsic Viscosity (IV) is determined according to ASTM-D1601/2004 at 135° C. in decalin, the dissolution time being 16 hours, with DBPC as anti-oxidant in an amount of 2 g/l solution, by extrapolating the viscosity as measured at different concentrations to zero concentration. There are several empirical relations between IV and Mw, but such relation is highly dependent on molar mass distribution. Based on the equation $M_w=5.37*10^4 [IV]^{1.37}$ (see EP 0504954 A1) an IV of 4.5 dl/g would be equivalent to a $M_w$ of about 422 kg/mol.

Tensile properties, i.e. tenacity and modulus were determined on elongated elements as specified in ASTM D885M, using a nominal gauge length of the fibre of 500 mm, a crosshead speed of 50%/min and Instron 2714 clamps, of type Fibre Grip D5618C. For calculation of the strength, the tensile forces measured are divided by the titre, as determined by weighing 10 meter of fibre; values in GPa are calculated assuming the natural density of the polymer, e.g. for UHMWPE is 0.97 g/cm$^3$.

Breaking strength of the chains is determined on dry samples using a horizontal tensile tester with a max load capacity of 15,000 kN at a temperature of approximately 21 degree C., and at a rising force velocity of 250 kN/min. The chains were tested using D-shackles with a diameter of the shackle of 95 mm (<1 MTex) and 220 mm (>1 MTex). The D-shackles are arranged in an orthogonal configuration for the comparative chains and in a parallel configuration for chain of the Example.

The melting temperature (also referred to as melting point) of polymer is determined by DSC on a power-compensation PerkinElmer DSC-7 instrument which is calibrated with indium and tin with a heating rate of 10° C./min. For calibration (two point temperature calibration) of the DSC-7 instrument about 5 mg of indium and about 5 mg of tin are used, both weighed in at least two decimal places. Indium is used for both temperature and heat flow calibration; tin is used for temperature calibration only.

Chain tenacity was calculated by dividing the breaking strength of the chain by the titer of the 2 legs of the braided cores. Covers or coatings are disregarded when measuring the titer.

Efficiency is determined by dividing the tenacity of the chain-link or chain by the tenacity of the load bearing yarn or yarns.

EXAMPLES AND COMPARATIVE EXPERIMENT

Comparative Experiments

The chain-links of the comparative experiments are constructed according to the example as disclosed in WO2013/186206 whereby for comparability the load bearing Dyneema® SK75 in the narrow weave was substituted by Dyneema® DM20, a 1760 dtex yarn having a tenacity of 32.0 cN/dtex produced and supplied by DSM Dyneema, The Netherlands. This narrow weave, or strip, employed in the comparative examples has a titer of 272800 dtex and a nominal breaking strength of about 39 kN.

Comparative Experiment 1 and 2 were constructed by interlacing 3 chain-links produced according to the comparative experiment in WO2013/186206, each of the 3 chain-links consisting of 8 and 12 turns of the DM20 narrow weave respectively, the 2 ends of each narrow weave of each chain-link being stitched together. Further properties and the maximum break load (MBL) of the 2 chains are reported in Table 1.

In Comparative Experiment 3, a chain according to Example II of document WO2008/089798 has been produced. The chain had 4 engaging loops of 16 Dyneema® SK75 yarns of 1760 dtex, produced and supplied by DSM Dyneema. This chain was fixed by air-splicing. Accordingly, each loop was formed from an air-spliced multifilament yarn bundle of 16×1760 dtex (28160 dtex) with a diameter of about 4 mm and a theoretical strength of 9856 N of the yarn bundle. Further properties and the maximum break load (MBL) of the chain are reported in Table 1.

EXAMPLES

Example 1

A primary strand was braided from a total of 12 sub-strands, each sub-strand consisting of 7×15 Dyneema DM20 1760 dtex yarns as employed for the narrow weave of the Comparative Examples. Accordingly, the primary strand was a braided rope construction of 12×7×15×1760 dtex (2217600 dtex) with a diameter of about 20 mm and a strength of 400 kN. A single length of about 20 m of said primary strand was used to construct a first chain-link by starting from an end of the 20 m primary strand and forming a loop of about 3 m length (1 m diameter). With the remainder of the primary strand a total of 11 further loops were formed along the first circle in such a way that the 12 loops form a first Turk's head braided chain link construction from these 12 loops of the single primary strand whereby the pitch of the braid was about 10. The two free ends of the primary strand were buried inside the Turk's head braided chain-link construction. An alternative description of the braided chain-link would be a 12-lead 4-bight Turk's head braid. The chain link 10 formed of the Turk's head braided rope in the manner described above is shown in FIG. 1.

The second and third chain-links were formed from 2 additional 20 m lengths of the primary strand in a process as described for the first chain-link with the difference that the first loop and the further loops were passing through the center of the first chain-link, hence forming a chain consisting of 3 interlaced chain-links. The chain was subjected to a break load test. The primary strand (20 mm rope) broke twice without showing substantial slip of the deteriorated chain-link. Even with the primary strand fractured in 3 sections, the chain-link retained its total strength. The chain failed upon the third breakage of the primary strand of one of it links. Further properties and the maximum break load (MBL) of the chain of Example 1 are reported in Table 1.

Example 2

A chain construction similar to the one of Example 1 was prepared with the difference that the braided primary strand was braided from 12 sub-strands each sub-strand consisting of only 4 Dyneema DM20 1760 dtex yarns resulting in a braided rope construction of 84480 dtex with a diameter of about 5 mm and a strength of about 20 kN. From said primary strand braided chain-links with a diameter of about 0.3 m have been prepared, starting from about 4 m of said primary strand for each chain-link. Further details and MBL of the chain are reported in Table 1.

Example 3

A chain similar to the chain of Example 2 was prepared and further coated by impregnating it with an aqueous suspension of a very-low density polyethylene plastomer commercially available as Queo® (supplier Borrealis GmbH), dried for 24 hours at room temperature, resulting in a weight increase of about 20 wt %. Subsequently each of the braided chain-links was heat set for 7 minutes and 120° C. at 2 t load (about 10% of the MBL of the link). Details and break performance of the chain is provided in Table 1.

TABLE 1

Maximum break load and tenacity of chains

| | Basic strand [tex] | Turns (Loops) | Legs | 2 legs of cores [Mtex] | MBL [kN] | Chain tenacity [N/tex] |
|---|---|---|---|---|---|---|
| Comp. 1 | Weave: 27280 | 8 | 2 | 0.436 | 217.1 | 0.50 |
| Comp. 2 | Weave: 27280 | 12 | 2 | 0.655 | 329.8 | 0.50 |
| Comp. 3 | MF* Yarn: 176 | 16 | 2 | 0.005632 | 2.8 | 0.50 |
| Example 1 | Rope: 221760 | 12 | 2 | 5.32 | 3081 | 0.58 |
| Example 2 | Rope: 8448 | 12 | 2 | 0.203 | 137.25 | 0.67 |
| Example 3 | Rope: 8448 | 12 | 2 | 0.203 | 166.4 | 0.86 |

MF* Yarn = multifilament yarn (tex)

The invention claimed is:

1. A chain comprising:
   a plurality of interconnected chain-links, wherein
   at least one of the interconnected chain-links comprises a braided core comprising at least one primary strand, wherein
   the at least one primary strand comprises polymeric elongated elements having a tenacity of at least 1.0 N/tex, and wherein
   the braided core comprises at least two consecutive turns of the at least one primary strand, and wherein
   the braided core comprises a cross-section which is comprised of a number of cross-sections of one of the primary strands originating from the same primary strand, and wherein
   the at least two consecutive turns of the primary strand within each link have a braided nature such that the braided core is a Turk's head braided core, and wherein
   the at least one primary strand is a braided, twisted or laid rope, and wherein
   the chain has a tenacity of at least 0.55 N/tex.

2. The chain of claim 1, wherein the Turk's head braided core comprises at least three consecutive turns of the at least one primary strand.

3. The chain of claim 1, wherein the Turk's head braided core comprises a plurality of primary strands, wherein the Turk's head braided core comprises at least two consecutive turns of each of the plurality of primary strands.

4. The chain of claim 3, wherein
   each of the plurality of primary strands comprises a plurality of polymeric elongated elements, and wherein each of the polymeric elongated elements is formed of the same type of polymer.

5. The chain of claim 3, wherein each of the plurality of primary strands comprises a plurality of polymeric elongated elements, and wherein at least one and another of the plurality of polymeric elongated elements differ by at least one property selected from the group consisting of material, tenacity, yarn titer, filament titer and creep rate.

6. The chain of claim 1, wherein the polymeric elongated elements of the at least one primary strand have a tenacity of at least 1.2 N/tex.

7. The chain of claim 1, wherein
the at least one primary strand comprises at least one braided or laid primary strand, and wherein
at least two terminal ends of the at least one braided or laid primary strand are connected together with a splice.

8. The chain of claim 1, wherein the at least one chain-link comprises a cover, and wherein either
(i) the at least one primary strand is sheathed with the cover, or
(ii) the Turk's head braided core is sheathed with the cover.

9. The chain of claim 1, wherein the polymeric elongated elements are at least partially coated with a thermoset or thermoplastic polymer.

10. The chain of claim 1, wherein the Turk's head braided core has a cross-section of between 5 $mm^2$ and 5 $dm^2$.

11. The chain of claim 1, wherein the chain has a tenacity of at least 0.60 N/tex.

12. The chain of claim 1, wherein the chain has a static strength of at least 300 kN.

13. The chain of claim 1, wherein the Turk's head braided core comprises at least four consecutive turns of the at least one primary strand.

14. The chain of claim 1, wherein the Turk's head braided core comprises at least six consecutive turns of the at least one primary strand.

15. The chain of claim 1, wherein the number of turns of the same primary strand in the Turk's head braided core is at most 24.

16. The chain of claim 1 wherein the number of turns of the same primary strand in the Turk's head braided core is at most 18.

17. The chain of claim 1, wherein the number of turns of the same primary strand in the Turk's head braided core is at most 12.

18. The chain of claim 1, wherein the Turk's head braided core comprises a plurality of primary strands, and wherein the Turk's head braided core comprises at least six consecutive turns of each of the plurality of primary strands.

19. The chain of claim 3, wherein each of the plurality of primary strands comprises a plurality of polymeric elongated elements comprising polymeric yarns of the same type.

20. The chain of claim 1, wherein the polymeric elongated elements of the at least one primary strand have a tenacity of at least 2.0 N/tex.

21. The chain of claim 1, wherein the polymeric elongated elements of the at least one primary strand have a tenacity of at least 2.5 N/tex.

22. The chain of claim 9, wherein the thermoset and the thermoplastic are polymer silicone resins and plastomers, respectively.

23. The chain of claim 1, wherein the Turk's head braided core has a cross-section of between 10 $mm^2$ and 3 $dm^2$.

24. The chain of claim 1, wherein the Turk's head braided core has a cross-section of between 50 $mm^2$ and 100 $cm^2$.

25. The chain of claim 1, wherein each of the polymeric elongated elements is an ultrahigh molecular weight polyethylene (UHMWPE) yarn having a tenacity of at least 1.8 N/Tex.

26. The chain of claim 1, wherein each of the polymeric elongated elements is a UHMWPE yarn having a tenacity of at least 2.5 N/Tex.

27. The chain of claim 1, wherein the polymeric elongated elements comprise fibers made from organic synthetic material selected from the group consisting of polyolefins, polyamides, polyaramides; poly(tetrafluoroethylene) (PTFE), poly(p-phenylene-2, 6-benzobisoxazole) (PBO), liquid crystal polymers, poly{2,6-diimidazo-[4,5b-4',5'e]pyridinylene-1,4(2,5-dihydroxy)phenylene}, polyesters, polyvinyl alcohols and polyacrylonitriles.

28. The chain of claim 1, wherein the polymeric elongated elements comprise fibers made from organic synthetic material selected from the group consisting of polypropylene (PP), polyethylene (PE), ultrahigh molecular weight polyethylene (UHMWPE), poly(p-phenylene terephthalamide), copolymers of para hydroxybenzoic acid and para hydroxynaphtalic acid, poly(hexamethyleneadipamide), poly(6-aminohexanoic acid); poly(ethylene terephthalate), poly(butylene terephthalate), and poly(1,4 cyclohexylidene dimethylene terephthalate).

* * * * *